(12) United States Patent
Sack (10) Patent No.: US 8,631,767 B1
(45) Date of Patent: Jan. 21, 2014

(54) LIVESTOCK GROOMING

(76) Inventor: L Jason Sack, Weldona, CO (US)

( * ) Notice: Subject to any disclaimer, the term of this patent is extended or adjusted under 35 U.S.C. 154(b) by 22 days.

(21) Appl. No.: 13/346,724

(22) Filed: Jan. 9, 2012

Related U.S. Application Data

(60) Provisional application No. 61/430,899, filed on Jan. 7, 2011.

(51) Int. Cl.
*A01K 13/00* (2006.01)

(52) U.S. Cl.
USPC ............................ 119/606; 119/600; 119/601

(58) Field of Classification Search
USPC ............... 119/601, 606; 34/643, 582, 585, 98
See application file for complete search history.

(56) References Cited

U.S. PATENT DOCUMENTS

| | | | |
|---|---|---|---|
| 3,378,065 A * | 4/1968 | Mitchell et al. | 165/122 |
| 5,926,972 A | 7/1999 | Di Peso et al. | |
| 6,305,325 B1 | 10/2001 | Sullivan | |
| 7,748,380 B1 * | 7/2010 | Phifer et al. | 128/201.25 |
| 7,775,180 B2 | 8/2010 | Denison et al. | |
| 8,011,114 B2 | 9/2011 | Johnson | |

* cited by examiner

*Primary Examiner* — Monica Williams
(74) *Attorney, Agent, or Firm* — Mitchell K. McCarthy (57) ABSTRACT

An apparatus and associated method for a livestock grooming device having a first canister containing a first blower that selectively imparts an airflow through an outlet of the first canister, and further having a second canister containing a second blower that selectively imparts another airflow through an outlet of the second canister. A manifold fluidly connects both outlets to a manifold outlet. A backflow preventer device between the second blower and the manifold outlet selectively prevents the airflow from the first canister from entering the outlet of the second canister.

20 Claims, 8 Drawing Sheets

LIVESTOCK GROOMING

RELATED APPLICATION

This application claims the benefit of the earlier filing date of U.S. provisional patent application Ser. No. 61/430,899.

FIELD

Embodiments of the present invention relate generally to livestock grooming devices and associated methodologies, and more particularly without limitation to a blower system and usage thereof in the livestock industry for drying or dressing livestock fur.

BACKGROUND

Blowers are used to groom the fur of various livestock animals, such as by blow drying and fluffing the fur after a livestock animal has been washed. The blower acts as a positive pressure source to provide pressurized air, which is directed toward the livestock animal via a hand-held flexible hose attached in fluid communication with the blower, to expedite drying and/or fluffing of the fur. In some cases, multiple blowers are used, in parallel or series, whereby airflow generated by the multiple blowers is directed out of a common orifice to concentrate the directed air flow. The user has the choice of using just one of the blowers for more delicate jobs or both blowers for heavier jobs. It is to innovations related to this subject matter that the claimed invention is generally directed.

SUMMARY

In some embodiments an apparatus is provided having a first canister containing a first blower that selectively imparts an airflow through an outlet of the first canister, and further having a second canister containing a second blower that selectively imparts another airflow through an outlet of the second canister. A manifold fluidly connects both outlets to a manifold outlet. A backflow preventer device between the second blower and the manifold outlet selectively prevents the airflow from the first canister from entering the outlet of the second canister.

In some embodiments a method is provided including steps of obtaining a livestock grooming device having a first canister containing a first blower, a second canister containing a second blower, and a manifold fluidly connecting outlets of both canisters to a manifold outlet; closing a backflow preventer device between the second blower and the manifold outlet; and activating only the first blower, the closed backflow preventer preventing any of the airflow from the first blower from entering an outlet of the second canister so that the entire airflow from the first blower flows through the manifold outlet.

DETAILED DESCRIPTION

A livestock grooming system is described that has a plurality of blowers, each being selectively engageable so that the user can operate the system with just one blower or alternatively with any desired number of blowers. For instance, in a system having two blowers the user might likely find it advantageous to begin by drying a washed animal's fur with the airflow delivered by both blowers running simultaneously. Afterward, when the animal is substantially dry, the user might likely find it advantageous to fluff the animal's fur with the comparatively less forceful airflow delivered by just one of the two blowers. The claimed embodiments provide advantageous solutions for compensating in the piping to prevent air from an active blower from flowing backward through another inactive blower.

Figure 1:
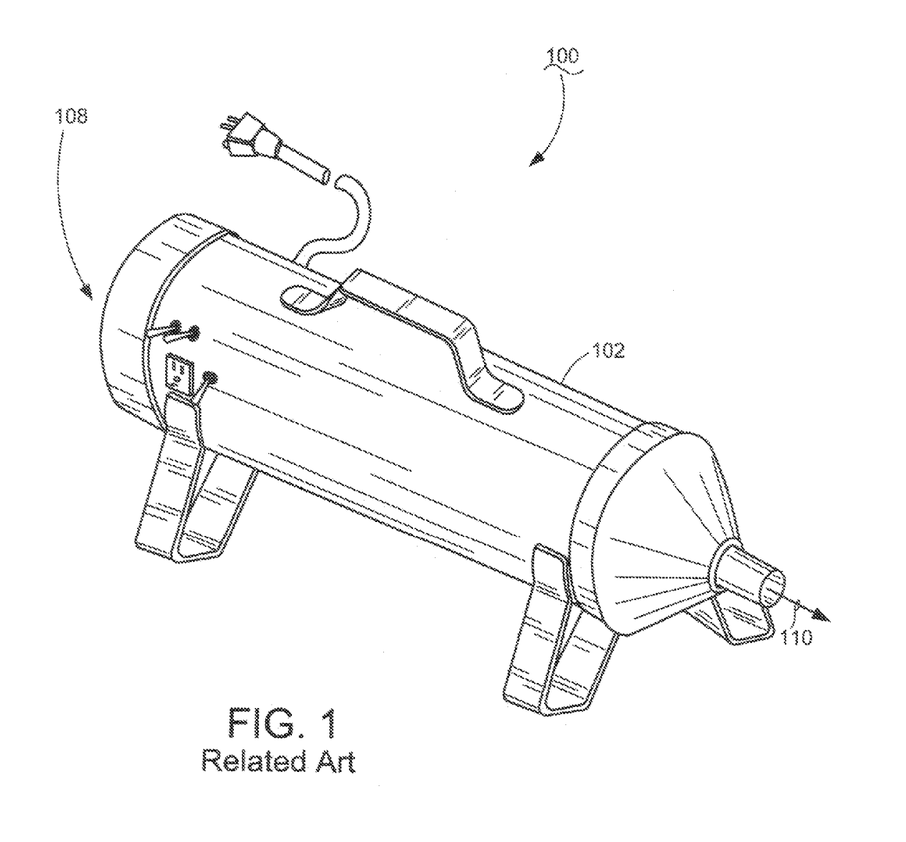
FIG. 1 is an isometric depiction of a blower device constructed in accordance with related art solutions.
Figure 2:
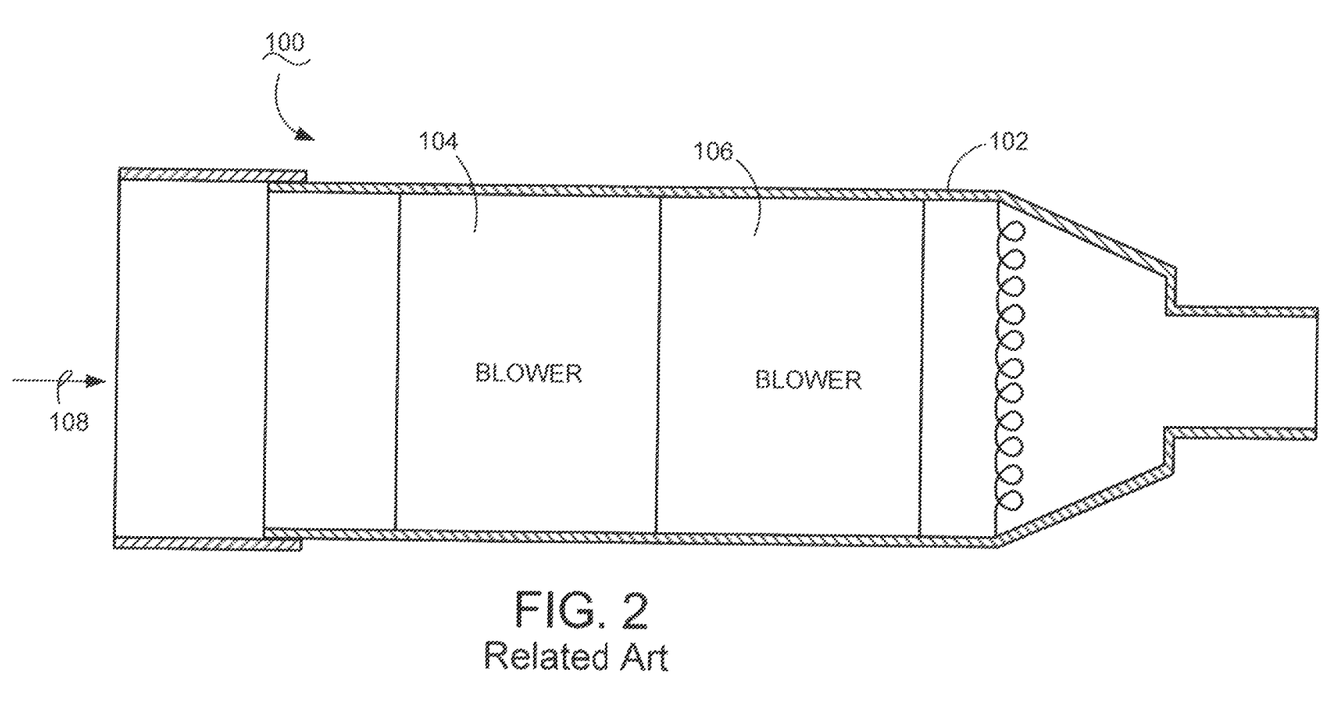
FIG. 2 is a partial diagrammatic cross-sectional view of the blower device of FIG. 1.

FIGS. 1 and 2 are isometric and diagrammatic partial cross-sectional depictions, respectively, of a dual blower device 100 that is constructed in accordance with embodiments of previous related art solutions. The blower device 100 is generally constructed of a canister 102 that contains two blowers 104, 106. The canister 102 has an inlet 108 where fresh air is drawn in to supply the blowers 104, 106. The blowers 104, 106 pressurize the supplied air and direct the pressurized air to exit the canister 102 from an outlet 110. Typically, a flexible hose (see FIG. 7) is connected at one end thereof to the stub defining the outlet 110 and a grooming tool, such as a nozzle or airbrush and the like, is connected to the opposing end of the flexible hose.

Figure 3:
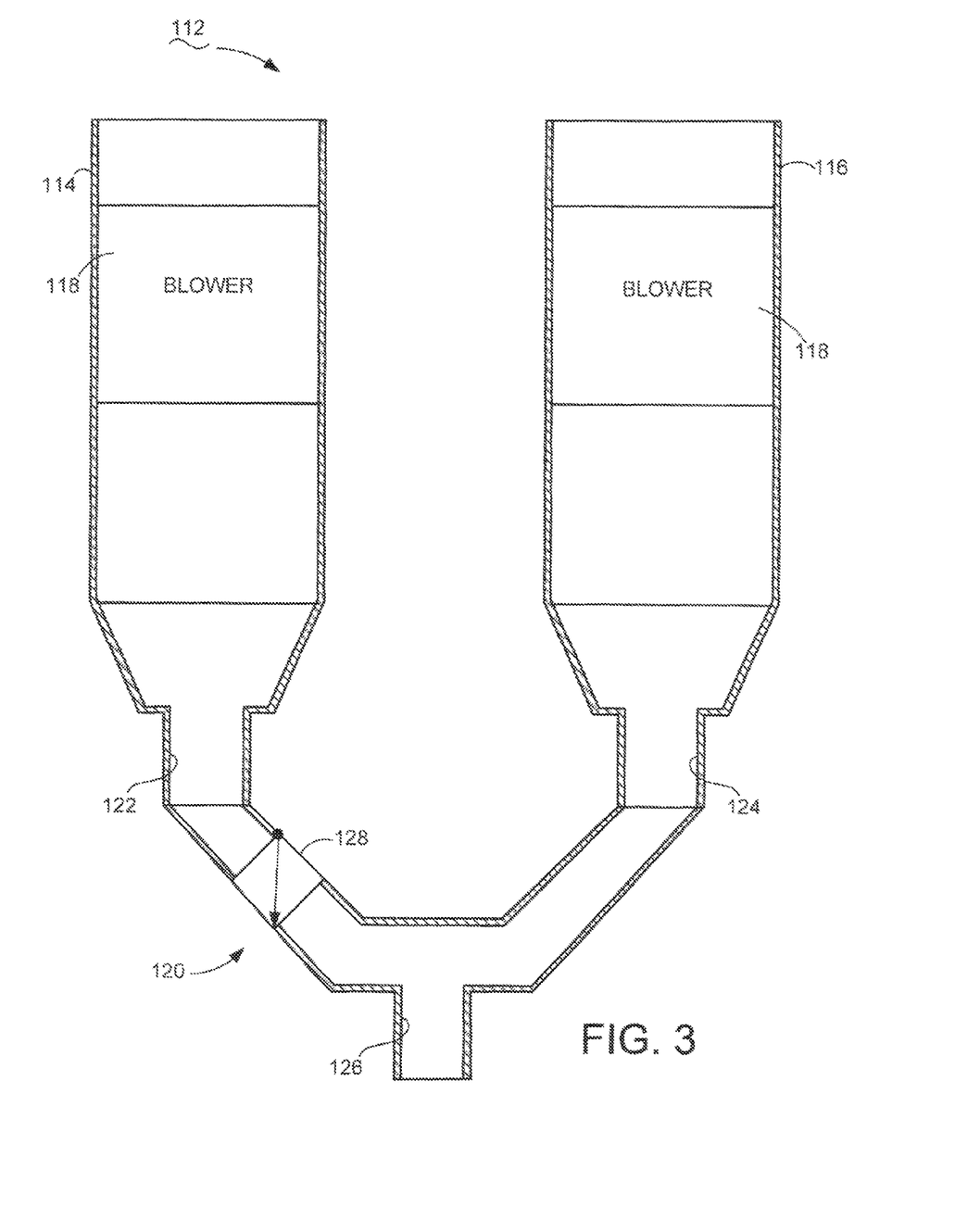
FIG. 3 is a diagrammatic cross-sectional depiction of a livestock grooming device that is constructed in accordance with embodiments of the present invention.

FIG. 3 diagrammatically likewise generally depicts a dual blower device, but in the form of a grooming device 112 that is constructed in accordance with embodiments of the present invention. In the illustrative embodiments of FIG. 3 the grooming device 112 has two canisters 114, 116, each containing one blower 118. Although not depicted, the skilled artisan will appreciate that the contemplated embodiments are not limited to either the number of canisters 114, 116 or the number of motors 118 in each canister 114, 116 depicted in the illustrative embodiments of FIG. 3. For example, in alternative equivalent embodiments, some of which follow, more than two canisters 114, 116 can be included in the grooming device 112 construction. Likewise, in alternative equivalent embodiments more than one blower 118 can be contained in one or more of the canisters 114, 116.

The grooming device 112 has a manifold 120 that in all canister arrangements generally fluidly connects the outlets 122, 124 of the respective canisters 114, 116 to a manifold outlet 126. In these illustrative embodiments the manifold outlet 126 provides a singular passageway for all of the airflow created by either or both of the blowers 118. In these illustrative embodiments the flexible hose (FIG. 7) is connected to the manifold outlet for directing the airflow to the desired point of use. In equivalent alternative embodiments (not depicted) the manifold can have two or more manifold outlets 126.

The manifold 120 in these illustrative embodiments includes a check valve 128 between the outlet 122 of the canister 114 and the manifold outlet 126 permitting airflow in only one direction, from the canister 114 to the manifold outlet 126. Thus, when only the canister 116 is powered on with the canister 114 powered off, the airflow from the powered canister 116 deadheads against the closed check valve 128 so that it does not flow backward through the canister 114.

The depiction of the check valve 128 is merely illustrative and not limiting of the contemplated embodiments of the present invention which generally provide a flow prevent device to prevent backflow through one of the powered off canisters from one or more other powered canisters. In equivalent alternative embodiments another type of valve such as but not limited to a butterfly valve 130 depicted in FIG. 4, or otherwise not depicted such as a gate valve, a ball valve, a solenoid valve, and the like can be used. An enumeration of all types of valves that can be used in replacement of the depicted check valve 128 and butterfly valve 130 is unnecessary for the skilled artisan to readily ascertain the scope of the claimed invention.

FIG. 3 also generally discloses the proposition that in some embodiments regardless of the number of canisters all but one of them can have a corresponding backflow preventer device, such as the check valve or the like, in the manifold between the respective canister's outlet and the manifold outlet. In that way the one canister without a corresponding backflow preventer is designated as the canister that is powered when the airflow of only one blower is needed. For example, without limitation, in some embodiments shown below with four canisters, the manifold can advantageously include three backflow preventer devices between respective outlets of three canisters, with only one of the four canisters remaining unrestricted by a backflow preventer device so that it would be designated as the first (and sometimes only) powered canister at lowest airflow requirement conditions. The skilled artisan will appreciate that in such a four canister construction if the minimum airflow requirement is an airflow produced by two of the canisters, then two of them could be without corresponding backflow preventer devices in the manifold to reduce cost.

Figure 4:
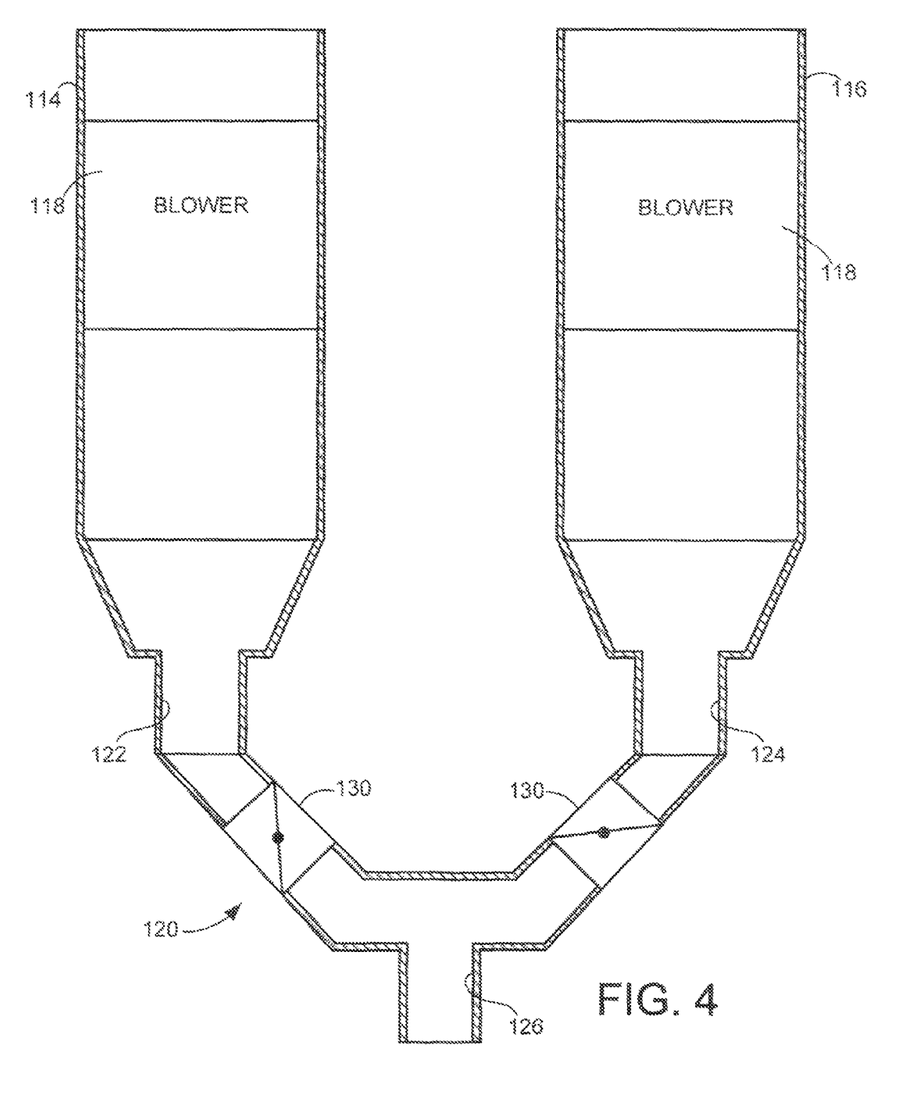
FIG. 4 is a diagrammatic cross-sectional depiction of a livestock grooming device that is constructed in accordance with alternative embodiments of the present invention.

FIG. 4, on the other hand, generally discloses the proposition that in other embodiments regardless of the number of canisters all of them can have a corresponding backflow preventer device in the manifold between the respective canister's outlet and the manifold outlet. In that way when the airflow of only one blower is needed, that designated canister can be duty cycled among the plurality of canisters for robustness and reliability sake. For example, in the illustrative embodiments of the four canister construction that follows it is contemplated that for maximum system flexibility regarding which one or more canisters to power, then each of the four canisters can be provided with a corresponding backflow preventer device in the manifold.

Figure 5:
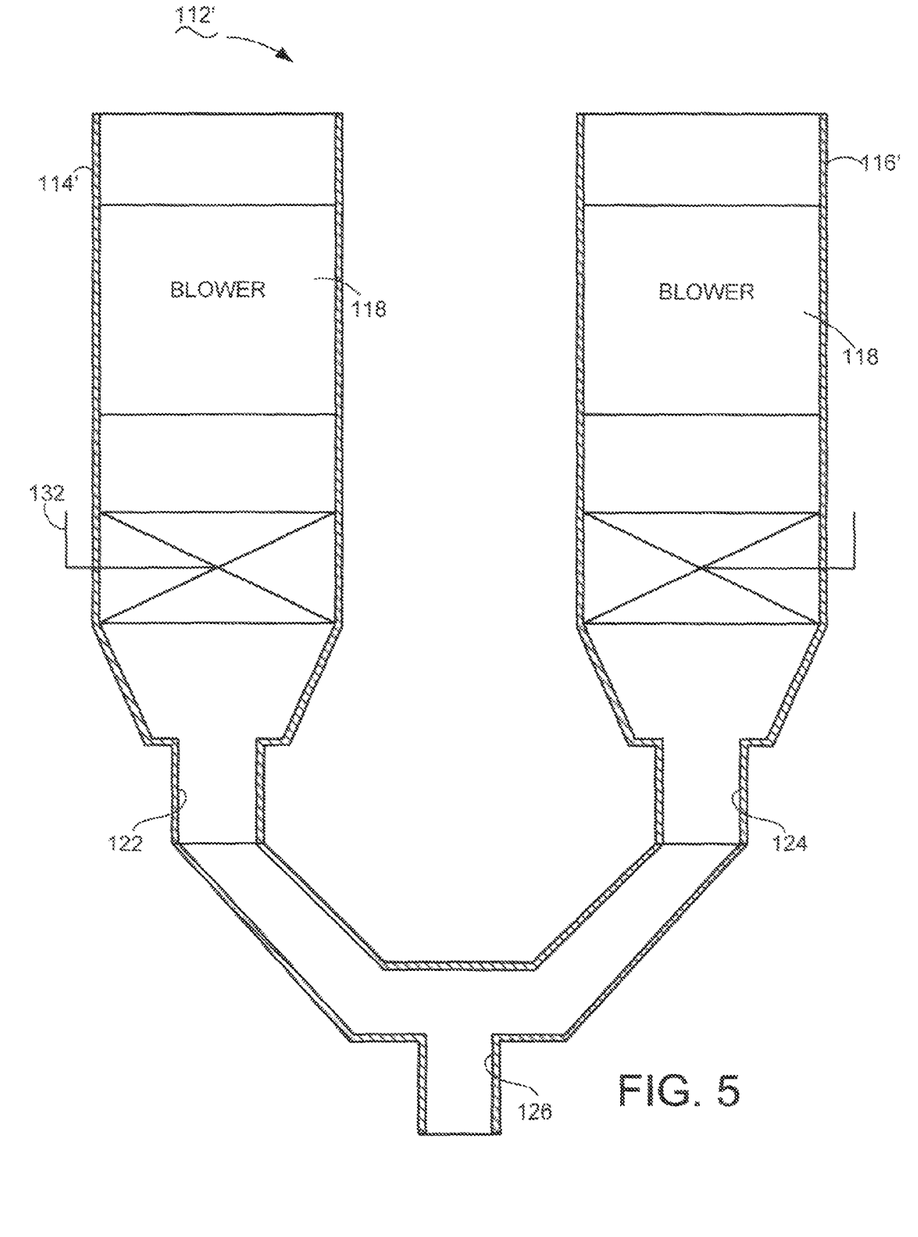
FIG. 5 is a diagrammatic cross-sectional depiction of a livestock grooming device that is constructed in accordance with alternative embodiments of the present invention.

FIG. 5 depicts illustrative embodiments similar to FIG. 4 except that here the backflow preventer devices, manual operated valves, are contained within each of the canisters 114', 116' instead of in the manifold 120'. The manual operated valves have an external lever 132 that is selectively positionable between a closed position and an open position. All that has been described herein is likewise applicable to the illustrative embodiments of FIG. 5. That is, the number of canisters containing a backflow preventer device can be all or some of the total number of canisters, depending on the minimum airflow requirement and the cost benefit balancing of constructing an arrangement that maximizes the system robustness and reliability in which each of the canisters can contain a corresponding backflow preventer device.

Figure 6:
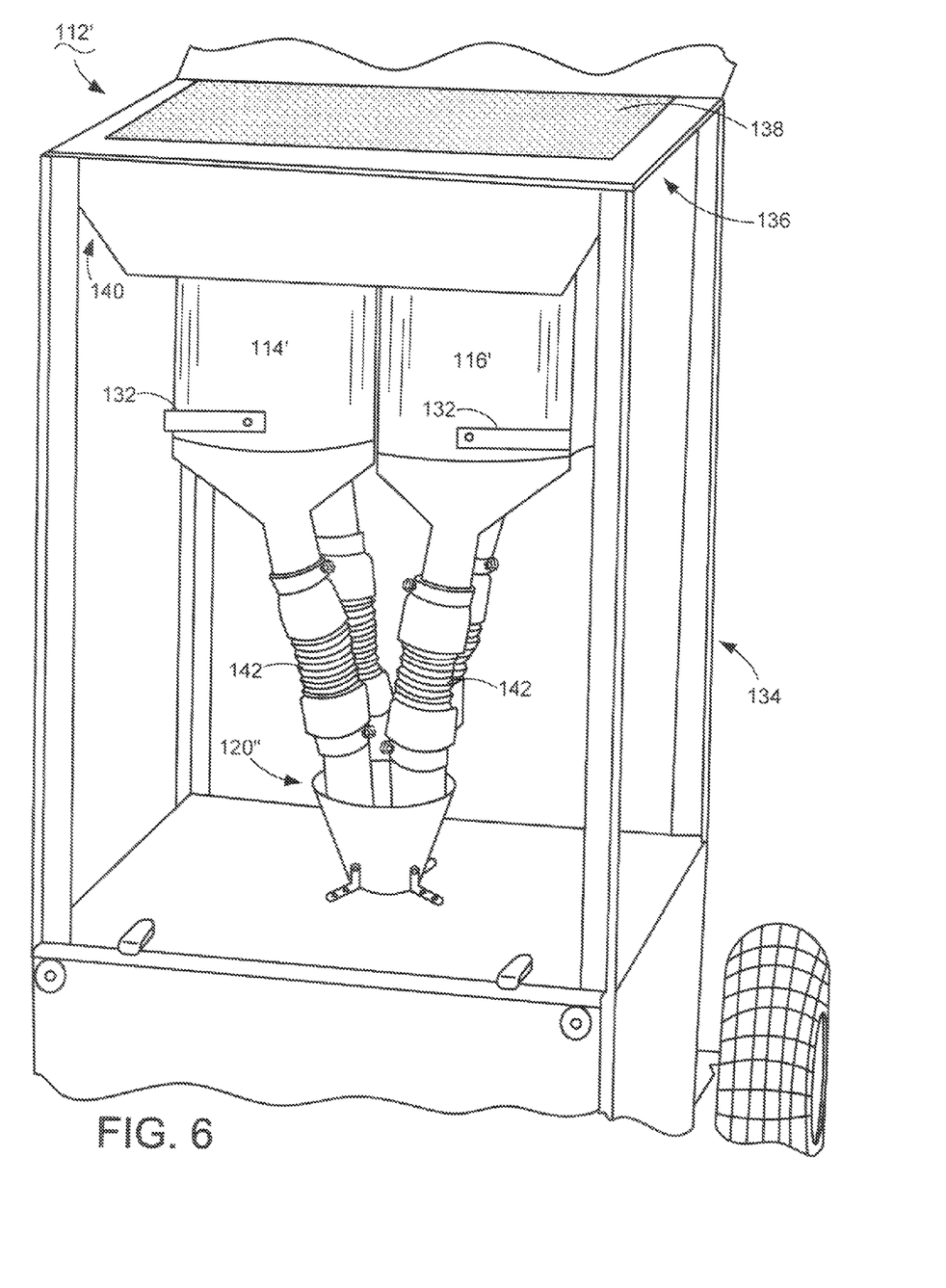
FIG. 6 is an elevational depiction of the livestock grooming device of FIG. 5.

FIG. 6 is an elevational view of a four canister grooming device 112 constructed in accordance with the diagrammatic depiction of FIG. 5. A tubular framework 134, such as of welded construction and the like, provides an upstanding supporting structure. In these illustrative embodiments the framework 134 is ultimately supported upon a pair of wheels to enhance the portability of the grooming device 112.

A filter assembly 136 is supported by the upper end of the framework 134. The filter assembly 136 includes a removable screen 138 that, when removed, provides access to a compartment 140 that is volumetrically oversized to contain an abundance of replaceable (or washable) filter media. The filter compartment is fluidly connected to the inlet ends of each of the canisters so that supply air is drawn through the filter media and then into the respectively powered canister. The filter media is contemplated as being reusable but a "one-use" (a filter intended to be discarded after a single use) type of filter media can also be employed. It is further contemplated that the filter media may be formed of any number of filter portions that, in some embodiments, abut and/or overlap to provide one continuous filter. The filter compartment 140 is contemplated as being made of metal but other materials can be used, for example, plastic, fiberglass, composite materials, etc. In these illustrative embodiments the filter compartment 140 is shown to be generally rectangular in shape but it is to be understood that any shape can be provided. In any event, preferably the filter compartment is sized such that a filter surface area is provided that is larger than the sum of the intake openings of the canisters. The abundantly large filter surface and volume is well suited for the typical environment where an inordinate amount of hair, dirt, oil and grease abound. Comparatively smaller filters in those environmental conditions are significantly quicker to become saturated with impurities and, accordingly, adversely affect blower efficiency and power. The comparatively larger surface area of the disclosed embodiments performs comparatively longer without becoming congested, permitting the user to increase the time between filter changes and cleaning.

Although not depicted, it will be noted that the framework 134 also provides a rigid supporting structure for the attachment of enclosure panels (removable or not removable) to partially or entirely surround the canisters. Such an enclosure advantageously makes the grooming device 112 operate quieter and hence less disturbing to livestock in the proximity of the device while it is being operated. The enclosure panels can be insulated to enhance the performance of that advantageous benefit. It will be noted that in these illustrative embodiments the lower portion of the framework 134 supports enclosure panels that define a storage enclosure sized for storing a desired length of flexible hose for use when the grooming device 112 is operational.

Another advantageous feature of the illustrative embodiments of FIG. 6 is the use of a flexible connector 142 between the outlets of each of the canisters and the manifold 120". The flexible connector 142 is preferably constructed of an elastomeric material and the like in order to damp vibrations from the blowers from propagating to the manifold and, in turn, to the enclosure and/or the framework. That damping advantageously reduces if not prevents the noise and physical stress otherwise imparted by those vibrations.

Figure 7:
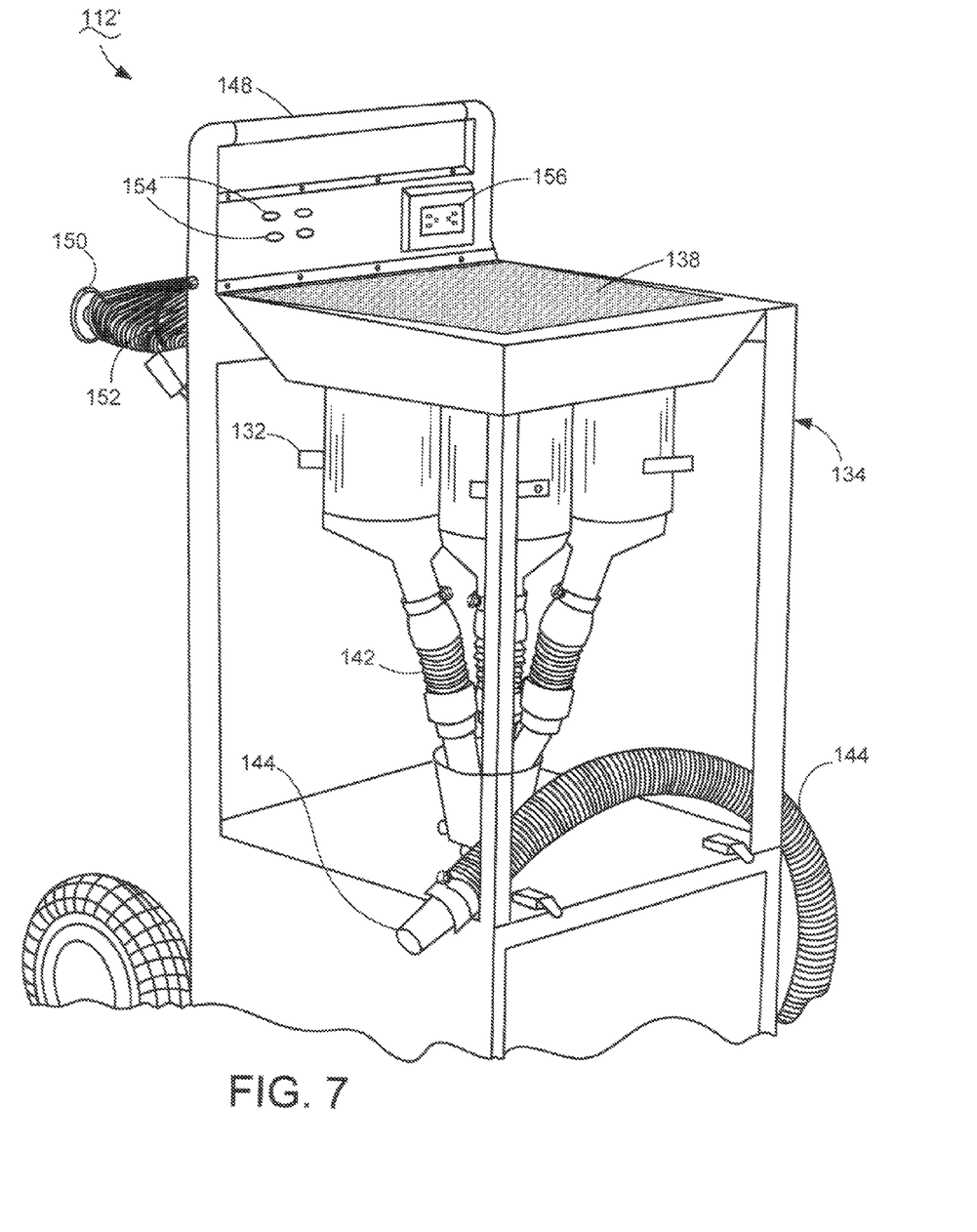
FIG. 7 is an elevational depiction of the livestock grooming device of FIG. 5.

FIG. 7 is another isometric view of the grooming device 112' of FIG. 6 further showing a distal end 144 of a flexible hose 146 removed from the lower storage compartment and readied for use in operation of the grooming device 112'. In these illustrative embodiments the distal end 144 forms a nozzle for intensifying the airflow for its intended use in grooming an animal. An upwardly projecting portion of the framework 134 includes a handle 148 for ease in grasping while moving the grooming device 112'. An orthogonally projecting rack 150 provides a width-wise support for wrapping an electrical extension cord 152 for storage thereof.

In these illustrative embodiments having four canisters there are four toggle switches 154 for individually powering each of the four blowers. Although not shown, in alternative equivalent embodiments similar switches are provided for selectively powering a heating element in one or more of the canisters. Also provided in the upstanding portion of the framework is a utility electrical receptacle 156 to make remote electrical power provided by the electrical extension cord 152 also available for use locally with auxiliary powered equipment used in conjunction with the grooming device 112'.

Figure 8:
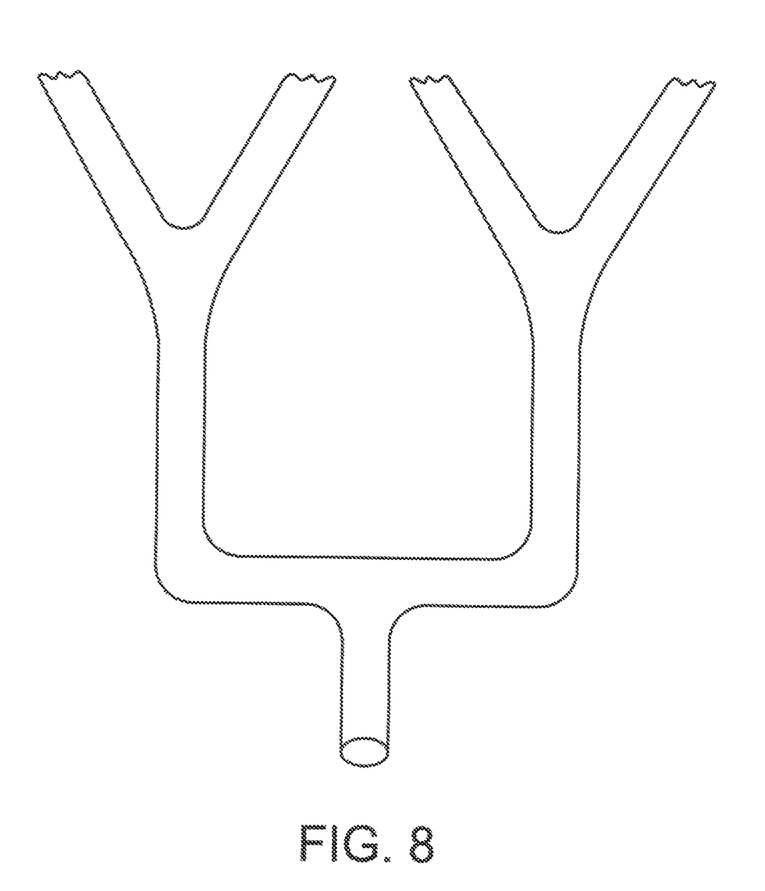
FIG. 8 is a diagrammatic piping depiction of another four-into-one header constructed in accordance with embodiments of the present invention.

It will be noted that the manifold 120" described in FIGS. 6 and 7 fluidly connect all four of the fluid lines into one piping component; a four-into-one type of manifold. The contemplated embodiments are not so limited, in that FIG. 8 diagrammatically depicts illustrative alternative equivalent embodiments constructed by the joinder of two two-into-one piping components to ultimately provide the four-into-one piping arrangement.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. An apparatus comprising:
   a first canister containing a first blower that selectively imparts a first airflow through an outlet of the first canister;
   a second canister containing a second blower that selectively imparts a second airflow through an outlet of the second canister;
   a first flexible connector connected to the first canister's outlet;
   a different second flexible connector connected to the second canister's outlet;
   a rigid piping manifold having a first manifold inlet connected to the first flexible connector and a second manifold inlet connected to the second flexible connector, so that the first flow passes entirely through the first flexible connector before entering the rigid piping manifold and the second flow passes entirely through the second flexible connector before entering the rigid piping manifold, the rigid piping manifold fluidly combining the first and second manifold inlets into only one manifold outlet; and
   a backflow preventer device between the second blower and the manifold outlet, selectively preventing the first airflow from entering the second canister.

2. The apparatus of claim 1 comprising a third canister containing a third blower that selectively imparts a third airflow through an outlet of the third canister, and a different third flexible connector connecting the third canister's outlet to a third inlet of the rigid piping manifold.

3. The apparatus of claim 2 comprising a fourth canister containing a fourth blower that selectively imparts a fourth airflow through an outlet of the fourth canister, and a different fourth flexible connector connecting the fourth canister's outlet to a fourth inlet of the rigid piping manifold.

4. The apparatus of claim 3 comprising an upright framework supporting the four canisters and the rigid piping manifold, the frame including a roller upon which the frame is transportable.

5. The apparatus of claim 4 wherein each of the canisters is attached to a filter compartment that is sized to hold a filter media adjacent an inlet of each of the canisters.

6. The apparatus of claim 5 wherein the filter compartment comprises an intake screen that is sized larger than the cross sectional area of the four canister inlets.

7. The apparatus of claim 6 wherein the framework comprises an enclosure for storing a flexible hose that is connectable to the manifold outlet.

8. The apparatus of claim 7 wherein the flexible hose connects to the manifold outlet inside the enclosure.

9. The apparatus of claim 8 wherein the framework supports a switch for each of the blowers and a utility electrical receptacle.

10. A method comprising:
    obtaining a livestock grooming device having a first canister containing a first blower, a second canister containing a second blower, a first flexible connector connected to the first canister, a second flexible connector connected to the second canister, and a rigid piping manifold having a first manifold inlet connected to the first flexible connector and a second manifold inlet connected to the second flexible connector, the rigid piping manifold fluidly combining the first and second manifold inlets into only one manifold outlet;
    closing a backflow preventer device between the second blower and the manifold outlet; and
    activating only the first blower, the closed backflow preventer preventing any of the airflow from the first blower from entering an outlet of the second canister so that the entire airflow from the first blower flows through the manifold outlet.

11. A livestock grooming apparatus, comprising:
    a framework including a roller upon which the framework is transportable;
    four canister blowers supported by the framework, each canister blower selectively imparting a respective airflow;
    a rigid piping manifold having four manifold inlets that are fluidly combined into only one manifold outlet; and
    four flexible connectors, each connecting one of the canister blowers to one of the manifold inlets so that each of the airflows passes entirely through the respective flexible connector before entering the rigid piping manifold.

12. The livestock grooming apparatus of claim 11 comprising a backflow preventer device between a selected canister blower and the manifold outlet, the backflow preventer device preventing airflow from another canister blower from entering the selected canister blower.

13. The livestock grooming apparatus of claim 12 comprising three backflow preventer devices, one of the three backflow preventer devices between each of three of the canister blowers and the manifold outlet.

14. The livestock grooming apparatus of claim 12 comprising four backflow preventer devices, one of the four backflow preventer devices between each of the canister blowers and the manifold outlet.

15. The livestock grooming apparatus of claim 11 wherein the framework supports a filter compartment that is sized to hold a filter media adjacent an inlet of each of the canister blowers.

16. The livestock grooming apparatus of claim 15 wherein the filter compartment comprises an intake screen that is sized larger than the cross sectional area of the four canister blower inlets.

17. The livestock grooming apparatus of claim 11 wherein the framework supports an enclosure for storing a flexible hose that is connectable to the manifold outlet.

18. The livestock grooming apparatus of claim 17 wherein the flexible hose connects to the manifold outlet inside the enclosure.

19. The livestock grooming apparatus of claim 11 wherein the framework supports a switch for each of the blowers and a utility electrical receptacle.

20. The livestock grooming apparatus of claim 11 wherein at least one of the canister blowers includes a heater for selectively warming the airflow.

\* \* \* \* \*